United States Patent [19]
Smolarek

[11] Patent Number: 6,048,384
[45] Date of Patent: Apr. 11, 2000

[54] PSA PROCESS AND SYSTEM USING SIMULTANEOUS TOP AND BOTTOM EVACUATION OF ABSORBENT BED

[76] Inventor: James Smolarek, 6696 Liebler Rd., Boston, N.Y. 14025

[21] Appl. No.: 08/987,790

[22] Filed: Dec. 9, 1997

[51] Int. Cl.[7] .................................................. B01D 53/053
[52] U.S. Cl. .................................. 95/98; 95/101; 95/102; 95/105; 95/130
[58] Field of Search ......................... 95/96–98, 100–105, 95/130, 138

[56] References Cited

U.S. PATENT DOCUMENTS

| | | | |
|---|---|---|---|
| 3,142,547 | 7/1964 | Marsh et al. .............................. | 95/100 |
| 3,788,036 | 1/1974 | Lee et al. ................................... | 55/25 |
| 3,977,845 | 8/1976 | Walter ....................................... | 95/100 |
| 4,194,890 | 3/1980 | McCombs et al. ...................... | 95/98 X |
| 4,340,398 | 7/1982 | Doshi et al. ............................... | 55/25 |
| 4,381,189 | 4/1983 | Fuderer ..................................... | 95/100 |
| 4,461,630 | 7/1984 | Cassidy et al. ........................... | 95/100 |
| 4,723,966 | 2/1988 | Fuderer ..................................... | 95/98 |
| 4,756,723 | 7/1988 | Sircar ....................................... | 95/103 |
| 4,816,039 | 3/1989 | Krishnamurthy et al. ................ | 55/26 |
| 4,981,499 | 1/1991 | Hay et al. ................................. | 95/100 |
| 5,032,150 | 7/1991 | Knaebel ................................... | 95/98 X |
| 5,254,154 | 10/1993 | Gauthier et al. .......................... | 95/12 |
| 5,258,059 | 11/1993 | Yamaguchi et al. ..................... | 95/100 |
| 5,370,728 | 12/1994 | LaSala et al. ............................ | 95/101 |
| 5,505,765 | 4/1996 | Kaji et al. ................................. | 95/100 |
| 5,518,526 | 5/1996 | Baksh et al. ........................... | 95/101 X |
| 5,565,018 | 10/1996 | Baksh et al. ............................. | 95/100 |
| 5,658,371 | 8/1997 | Smolarek et al. ........................ | 95/101 |
| 5,702,504 | 12/1997 | Schaub et al. ............................ | 95/101 |
| 5,733,359 | 3/1998 | Doong et al. ........................... | 95/98 X |
| 5,735,938 | 4/1998 | Baksh et al. .............................. | 95/101 |

*Primary Examiner*—Robert H. Spitzer
*Attorney, Agent, or Firm*—Robert J. Follett

[57] ABSTRACT

The present invention relates to the recovery of low purity oxygen gas from the top of an adsorber vessel into a receiver tank to be used as a purge reflux gas. Recovery of void gas results in improved process efficiency. The invention may also employ a simultaneous evacuation from the top of the adsorber to remove the lower purity void gas while the main waste evacuation step is conducted. This simultaneous co-current top void gas recovery and counter-current waste evacuation from both ends of the adsorber allows for an overall increase in product recovery of between 3–5% over conventional processes.

10 Claims, 4 Drawing Sheets

SIMULTANEOUS TOP AND BOTTOM EVACUATION

PRODUCT PRESSURIZATION WITH PURGE AND OVERLAP EQUALIZATION

STEP#1 RAISING PRESSURE FEED WITH
      OVERLAP PRODUCT PRESSURIZATION

STEP#2 RAISING PRESSURE FEED

STEP#3 CONSTANT PRESSURE FEED
AND MAKE PRODUCT

STEP#4 FALLING PRESSURE EQUALIZATION

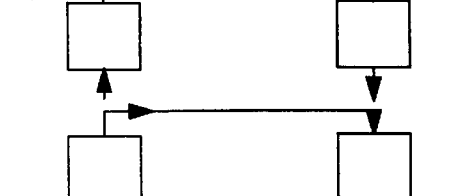

STEP#5 FALLING PRESSURE EVACUATION
WITH OVERLAP EQUALIZATION

STEP#6 FALLING PRESSURE EVACUATION

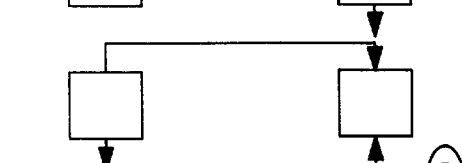

STEP#7 FALLING PRESSURE EVACUATION

STEP#8 OXYGEN PURGE

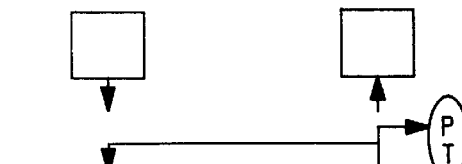

STEP#9 RAISING PRESSURE FEED
WITH OVERLAP EQUALIZATION

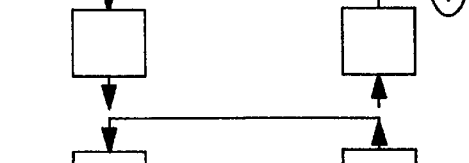

STEP#10 RAISING PRESSURE FEED WITH
OVERLAP EQUALIZATION

FIG. 1

SIMULTANEOUS TOP AND BOTTOM EVACUATION

STEP#1 RAISING PRESSURE FEED WITH
   OVERLAP PRODUCT PRESSURIZATION

STEP#2 RAISING PRESSURE FEED

STEP#3 CONSTANT PRESSURE FEED
AND MAKE PRODUCT

STEP#4 FALLING PRESSURE EQUALIZATION

STEP#5 FALLING PRESSURE EVACUATION
WITH OVERLAP EQUALIZATION

STEP#6 FALLING PRESSURE BOTTOM
EVACUATION WITH TOP VOID
EVACUATION

STEP#7 FALLING PRESSURE EVACUATION

STEP#8 OXYGEN PURGE FROM LOW PURITY
   OXYGEN TANK

STEP#9 RAISING PRESSURE FEED
WITH OVERLAP EQUALIZATION

STEP#10 RAISING PRESSURE FEED WITH
OVERLAP EQUALIZATION

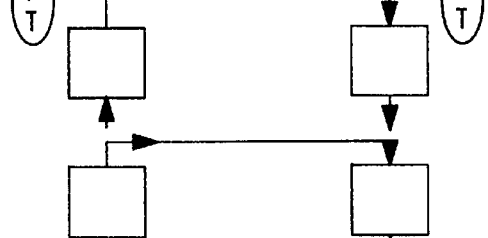
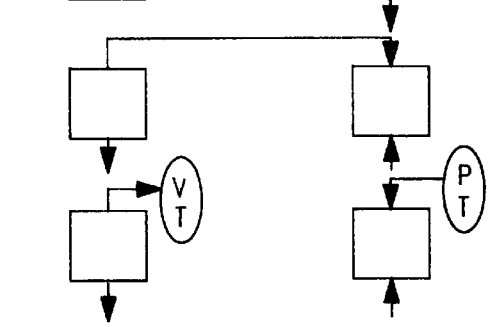
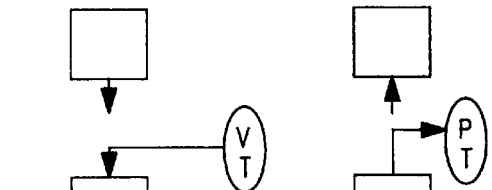
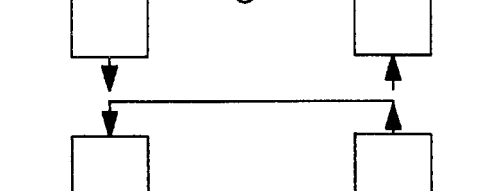
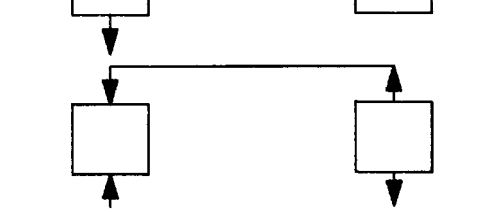

FIG. 2

CONTINUOUS FEED AND VACUUM PUMP OPERATION
SIMULTANEOUS TOP AND BOTTOM EVACUATION

STEP#1 RAISING PRESSURE FEED WITH
OVERLAP PRODUCT PRESSURIZATION

STEP#2 RAISING PRESSURE FEED

STEP#3 CONSTANT PRESSURE FEED
AND MAKE PRODUCT

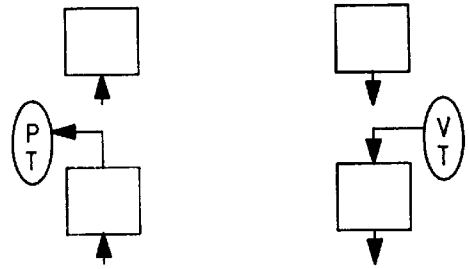

STEP#5 FALLING PRESSURE EVACUATION
WITH OVERLAP EQUALIZATION

STEP#6 FALLING PRESSURE BOTTOM
EVACUATION WITH TOP VOID
EVACUATION

STEP#7 FALLING PRESSURE EVACUATION

STEP#8 OXYGEN PURGE FROM LOW PURITY
OXYGEN TANK

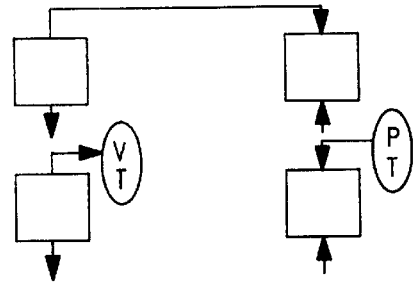
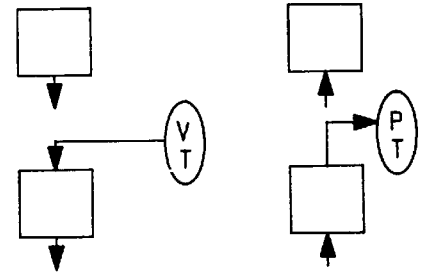

STEP#10 RAISING PRESSURE FEED WITH
OVERLAP EQUALIZATION

FIG. 4

PSA PROCESS AND SYSTEM USING SIMULTANEOUS TOP AND BOTTOM EVACUATION OF ABSORBENT BED

FIELD OF THE INVENTION

This invention is directed towards vacuum/pressure swing adsorption (V/PSA) process cycles. More particularly the invention relates to PSA process cycles having improved efficiency and product recovery.

BACKGROUND OF THE INVENTION

Conventional 2-bed PSA systems have feed adsorption and waste removal steps, and as such subsequent cycling of the adsorbers is inevitable. During such cycling processes, adsorption fronts are created within the adsorbent beds. Efficient cycle design with advanced adsorbents has resulted in moving these adsorption fronts close to breakthrough at both ends of the bed. This results in a gas enriched in the light component being left at the top of the adsorption front and also in any upper head space within the adsorber vessel at the end of a cycle. In a PSA cycle this enriched gas is referred to as void gas.

Conventional processes either leave this non-recovered void gas in the adsorber, which will act as an inefficient purge during the evacuation period, or remove this void gas prior to the waste removal step by driving the separation front out of the top of the adsorber during the product make step or equalization depressurization steps. These options result in inefficient operation of the cycle.

Improvements to conventional processes have included the addition of equalization, purge and product repressurization steps. A typical process and system is shown in FIG. 1 and described in U.S. Pat. No. 5,702,504 (Smolarek et al). This process requires two adsorber beds, one product receiver (PT), one feed blower and one vacuum pump with appropriate switching valves. The steps in the process are as follows:

Step #1 Raising pressure feed with counter-current top pressurization with product tank oxygen;
Step #2 Raising pressure feed;
Step #3 Constant pressure product make step;
Step #4 Co-current void gas recovery supplying this gas as equalization to the other adsorber bed;
Step #5 Co-current void gas recovery with counter-current evacuation; supplying void gas to the other adsorber bed;
Step #6 Falling pressure evacuation;
Step #7 Falling pressure evacuation;
Step #8 Counter-current purge with product oxygen;
Step #9 Counter-current purge/repressurization with void gas from the other bed;
Step #10 Counter-current repressurization with void gas from the other bed while feeding.

In the cycle described above, top void gas is partially recovered through overlap equalization steps. Unfortunately, the problem with equalization step recovery is that void gas recovery is ended after the beds are equalized. Multiple bed cycles can be employed increasing the void gas recovery, but limits are still reached as to the quantity which can be recovered.

Present cycles, such as those described in U.S. Pat. No. 5,518,526 (Baksh et al) and U.S. Pat. No. 5,702,504 also employ overlap equalization with the feed or evacuation steps. These steps are directed toward increasing the utilization of the adsorbent and mechanical equipment. These steps do not necessarily increase the recovery of void gas, and in some cases this overlap feature actually reduces the recovery of void gas.

Thus there is a need for PSA processes and systems whereby top void gas may be effectively utilized.

OBJECTS OF THE INVENTION

It is therefore an object of the invention to increase the efficiency of air separation adsorption systems.

It is a further object of the invention to provide a system and process whereby top void gas may be recovered in an efficient manner.

SUMMARY OF THE INVENTION

The invention comprises, in a preferred embodiment, a pressure swing adsorption (PSA) method for extracting a more preferred gas from a mixture of said more preferred gas and a less preferred gas. The method employs an adsorbent bed within an enclosure which, on an equilibrium basis, exhibits a selective adsorption preference for said less preferred gas. The method preferably comprises the steps of:

a) pressurizing said adsorbent bed to a high pressure with a feed of said mixture to enable said adsorbent bed to adsorb said less preferred gas while simultaneously counter-currently feeding gas obtained from a product tank containing more preferred gas;

b) extracting from said bed at said high bed pressure, a flow of said more preferred gas and storing at least some of said flow of more preferred gas in a product tank;

c) desorbing said less preferred gas from said adsorbent bed by feeding void gas in said enclosure to a void gas storage tank, while simultaneously desorbing said less preferred gas from said adsorbent bed by venting said adsorbent bed to a low pressure region;

d) terminating feeding of said void gas to said void gas storage tank;

e) further desorbing said less preferred gas from said adsorbent bed by venting said adsorbent bed to a low pressure region;

f) purging said adsorbent bed by feeding to said adsorbent bed a portion of said void gas from said void gas storage tank while venting said adsorbent bed; and, g) pressurizing said adsorbent bed to an intermediate pressure with a flow of equalization gas from a second adsorber bed; and repeating steps a–g until a requirement for said more preferred gas is satisfied.

In a more preferred embodiment, the PSA method recited above has an additional step wherein the pressurizing step g) further feeds a portion of said more preferred gas from said product tank to pressurize said adsorbent bed, if said equalization gas is insufficient to cause said adsorbent bed to reach said intermediate pressure.

Another embodiment of the invention preferably comprises a PSA method for extracting a more preferred gas from a mixture of said more preferred gas and a less preferred gas, wherein the method employs first adsorbent bed and second adsorbent bed, each bed being contained in an enclosure and, on an equilibrium basis, and exhibiting a selective adsorption preference for said less preferred gas. The first adsorbent bed sequentially performs steps a, b, c, d, e, f and g while the second adsorbent bed concurrently and sequentially performs steps d, e, f, g, a, b and c wherein steps a–g comprise:

a) pressurizing one of said first adsorbent bed or said second adsorbent bed to a high pressure with a feed of said mixture to enable said adsorbent bed to adsorb said less preferred gas, while simultaneously counter-currently feeding gas obtained from a product tank containing more preferred gas;

b) extracting from said one of said first adsorbent bed or said second adsorbent bed at bed pressure, a flow of said more preferred gas and storing at least some of said flow of more preferred gas in said product tank;

c) desorbing said less preferred gas from said one of said first adsorbent bed or said second adsorbent bed by feeding void gas in said enclosure to a void gas storage tank, while simultaneously desorbing said less preferred gas from said adsorbent bed by venting said adsorbent bed to a low pressure region;

d) terminating feeding of said void gas to said void gas storage tank;

e) further desorbing said less preferred gas from said one of said first adsorbent bed or said second adsorbent bed by venting said one of said first adsorbent bed or said second adsorbent bed to a low pressure region;

f) purging said adsorbent bed means by feeding to said one of said first adsorbent bed or said second adsorbent bed a portion of said void gas from said void gas storage tank while venting said first adsorbent bed or said second adsorbent bed; and g) pressurizing said one of said first adsorbent bed or said second adsorbent bed to an intermediate pressure with a further flow of equalization gas from one of said first adsorbent bed or said second adsorbent; and repeating steps a–g until a requirement for said more preferred gas is satisfied.

In another preferred embodiment of the immediately preceding PSA method the pressurizing step g) feeds said preferred gas from said product tank to pressurize said one of said first adsorbent bed or said second adsorbent bed, if said void gas is insufficient to cause said one of said first adsorbent bed or said second adsorbent bed to reach said intermediate pressure.

BRIEF DESCRIPTION OF THE DRAWINGS

Other objects, features and advantages will occur to those skilled in the art from the following description of preferred embodiments and the accompanying drawings in which:

FIG. 1 is a process flow diagram showing a conventional PSA process cycle.

FIG. 2 is a process flow diagram showing one embodiment of a PSA process cycle of the invention.

FIG. 4 is a process flow diagram showing one embodiment of a PSA process cycle of the invention.

DETAILED DESCRIPTION OF THE INVENTION

Figure 3:
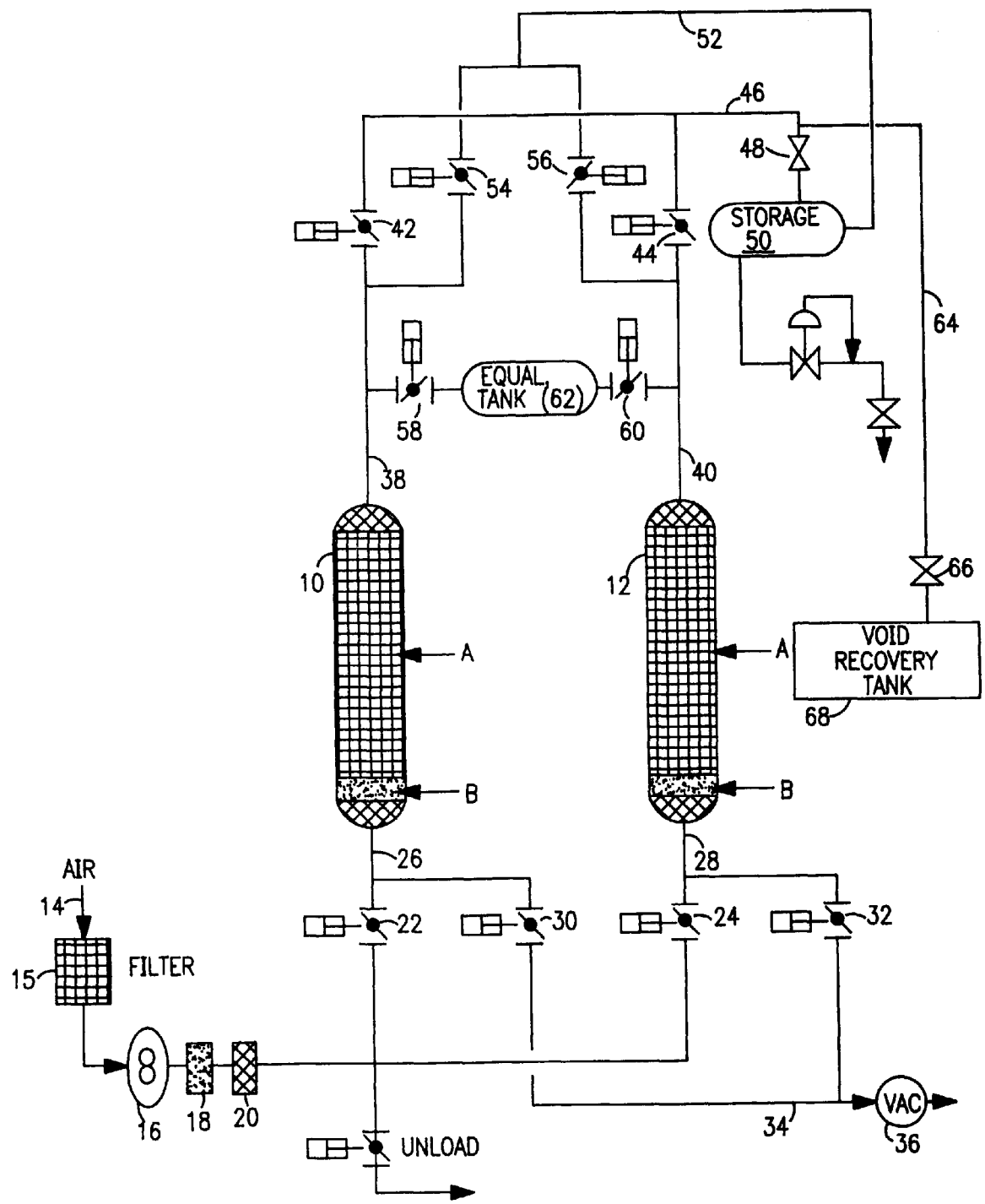
FIG. 3 is a schematic diagram illustrating a PSA system which may be used in the practice of the invention.

The basis for the present invention is the recovery of low purity oxygen gas (e.g. typically about 50 to about 88 vol. % oxygen, preferably from about 70 to about 85 vol. % oxygen) from the top of an adsorber vessel (e.g. the top void gas) into a receiver tank. This gas is later used as a purge reflux gas. Because recovery of void gas is increased, process efficiency is also increased. The invention can be practiced independently to the present schemes of equalization void gas recovery.

The invention may also employ a simultaneous evacuation from the top of the adsorber to remove the lower purity void gas while the main waste evacuation step is conducted. This simultaneous co-current top void gas recovery and counter-current waste evacuation from both ends of the adsorber allows for an overall increase in product recovery of between 3–5% over conventional processes.

The improvement to prior art cycle illustrated in FIG. 1 is shown in FIG. 2. The inventive system requires a void gas recovery tank (VT) in addition to two adsorber beds, one product receiver (PT), one feed blower and one vacuum pump with appropriate switching valves.

The steps, bed pressures and step times are generally described in Table 1 below. Note that the bed pressures and step times recited below are not intended to be limiting, and in fact are variable depending upon feed velocity and compression equipment sizing, temperature, and adsorbent characteristics.

Indeed, in the practice of the invention, pressures may range from about 30 to about 2 PSIA, preferably about 22 to about 4 psia and most preferably 20.1 to 4.6 psia, and cycle times may range from about 10 to about 60 seconds, preferably about 20 to about 40 and most preferably 25–30 seconds. Those skilled in the art will appreciate that further optimization of the inventive cycle may be possible by slightly altering these values and that the top evacuation process may be operated over a large range of conditions.

TABLE 1

Cycle Description

| Step Description | Step Time Seconds | Start Pressure | End Pressure |
| --- | --- | --- | --- |
| Step #1 Raising pressure feed with counter-current top repressurization with product tank oxygen | 3.5 | 10.45 | 16.75 |
| Step #2 Raising pressure feed | 2.5 | 16.75 | 18.5 |
| Step #3 Constant pressure product make step | 10 | 18.5 | 20.1 |
| Step #4 Co-current void gas supply to other bed for equalization | 1.75 | 20.1 | 16.5 |
| Step #5 Co-current void gas recovery with counter-current evacuation; supplying void gas to the other bed | 3.5 | 16.5 | 11.25 |
| Step #6 Co-current void gas recovery with counter current evacuation; supplying void gas to low purity oxygen storage receiver | 3.5 | 11.25 | 7.7 |
| Step #7 Falling pressure evacuation | 9.75 | 7.7 | 4.6 |
| Step #8 Counter-current purge with low purity void gas, and constant pressure evacuation | 2.75 | 4.6 | 4.6 |
| Step #9 Counter-current purge with void gas from other bed, with raising pressure evacuation | 1.75 | 4.6 | 6.6 |
| Step #10 Counter-current repressurization with void gas from other bed while feeding | 2.0 | 6.6 | 10.45 |

The PSA system (see FIG. 3) comprises two beds 10 and 12, each filled with adsorbent. An air inlet conduit 14 provides feed air via a filter 15 to a compressor 16 which, in turn, feeds compressed air through an optional oil and water filter 18 and carbon trap 20 to feed valves 22 and 24, and bed inlets 26 and 28, respectively. A pair of exhaust valves 30 and 32 connect bed inlets 26 and 28 to conduit 34, which is, in turn, coupled to an optional vacuum pump or pumps 36.

Beds 10 and 12 include product outlet conduits 38 and 40 which communicate, via valves 42 and 44, to a product conduit 46, and through a control valve 48 to a high pressure product storage tank 50. Conduit 52 and valves 54 and 56 enable a feed of product gas from storage tank 50 to beds 10 and 12, respectively.

Conduit 52 supplies the gas necessary for refluxing (purging and product pressurization). Conduit 46 further enables feed of the top void gas, via conduit 64 through valve 66, to low-pressure void recovery tank 68. The operation of control valve 66 is tuned to the cycle to allow for controlled gas removal during the top gas evacuation steps #6 and #1. Valve 66 is once again opened during steps #8 and #3 allowing for the introduction of the low purity purge gas into the vessel being purged.

Outlet conduits 38 and 40 may optionally be further connected via valves 58 and 60, respectively, to allow gas obtained from a cocurrent depressurization step to enter an equalization tank 62. All of the valves in FIG. 3 are operated electronically via a computer system and program logic (not shown). In a preferred embodiment of the invention, the gas required for purging is first taken from void recovery tank 68. If additional purge gas is required, then higher purity gas is taken from product storage tank 50, via conduit 52.

After purge is completed, then product pressurization begins. Gas required for the product pressurization step is obtained from product storage tank 50. However, if after purging, optional equalization tank 62 contains residual gas, then the residual gas is used in the early stage of product pressurization. Once the gas in equalization tank 62 is depleted, then the higher purity gas from storage tank 50 is used for completing product pressurization.

The cyclical process of the invention will now be described in greater detail with reference to FIG. 3. In the description, all valves are assumed to be closed in each step of the cycle, unless explicitly declared to be in the open position for that step.

Step #1 Raising pressure feed with counter-current top repressurization with product tank oxygen.

Bed 10: Feed (air) is introduced to the bottom of adsorber 10 by opening valve 22 to allow the feed air to enter and pressurize bed 10. The pressure rises during this step from a pressure level selected between 7–15 psia, preferably 9–12 psia, most preferably 10.45 psia, to a pressure level selected between 12–22 psia, preferably 15–18 psia, most preferably 16.75 psia. The step is between 2–6 seconds, preferably 3–4 seconds, most preferably 3.5 seconds in duration. Valve 54 is opened and Oxygen repressurization/reflux gas from product surge tank 50 is also simultaneously introduced into the top of adsorber 10 during this step.

Bed 12: During this time, valves 32, 44 and 66 are opened and bed 12 undergoes step #6.

Step #2 Raising pressure feed

Bed 10: Feed air is introduced into adsorber 10 and through open valve 22 and no oxygen gas is added or removed from the top. The pressure rises during this step from a pressure level selected between 12–22 psia, preferably 15–18 psia, most preferably 16.75 psia, to a pressure level selected between 15–28 psia, preferably 17–20 psia, most preferably 18.5 psia. The step is between 1–5 seconds, preferably 2–3 seconds, most preferably 2.5 seconds in duration. The pressure variation, without the addition of oxygen reflux, is slower in this step as compared to step #1.

Bed 12: During this time valve 32 is open and Bed 12 undergoes step #7.

Step #3 Constant pressure product make step

Bed 10: Feed air is introduced into the bottom of adsorber 10 via open valve 22 while oxygen product is removed from the top via open valve 54. The pressure remains relatively constant during this step. The pressure ranges between 15–30 psia, preferably 18–22 psia, most preferably 20.1 psia. The step is between 5–15 seconds, preferably 9–11 seconds, most preferably 10 seconds in duration. The feed air is supplied by compressor 16 with little change in pressure ratio. The oxygen product is supplied to the oxygen surge tank 50 via open valve 54.

The purity of the oxygen product remains relatively constant during the product make steps. The oxygen repressurization step #1 introduces high purity oxygen (e.g. oxygen having a purity of about 90 to about 95 vol. % oxygen) into the top of adsorber 10 prior to oxygen make step #3 eliminating any oxygen purity spike at the beginning of step #3. The product make step is terminated prior to the oxygen front actually breaking through at the top of bed 10.

Bed 12: During this step, Bed 12 is undergoing step 8. As such, valves 66 and 44 are open.

Step #4 Co-current void gas supply for equalization to bed 12.

Bed 10: The residual pressure and void oxygen product at the top of bed 10 is withdrawn during this step from the top of the vessel via open valve 42 is directed to adsorber 12 as oxygen purge via open valve 44. No flow is removed from the bottom of adsorber 12. The vessel pressure of adsorber 10 is lowered from a pressure level selected between 15–30 psia, preferably 18–22 psia, most preferably 20.1 psia, to a pressure level selected between 12–24 psia, preferably 15–18 psia, most preferably 16.5 psia. The step is between 1–4 seconds, preferably 1–2 seconds, most preferably 1.75 seconds in duration. The oxygen concentration starts at product purity (e.g. about 90% to about 95 vol. % oxygen) and falls to about 85% oxygen at the end of the step as the front breaks through at the top of the adsorbent bed 10. The ROOTS-type feed air compressor 16 is vented during this step.

Bed 12: Bed 12 is simultaneously undergoing step 9 and as such valve 32 is also open.

Step #5 Co-current void gas recovery with counter-current evacuation; supplying void gas to bed 12.

Bed 10: Waste nitrogen is removed from the bottom of adsorber 10 via open valve 30 through a ROOTS-type vacuum pump 36. The pressure falls from a pressure level selected between 12–24 psia, preferably 15–18 psia, most preferably 16.5 psia, to a pressure level selected between 7–18 psia, preferably 10–13 psia, most preferably 11.25 psia. The step is between 1–6 seconds, preferably 3–4 seconds, most preferably 3.5 seconds in duration. The oxygen concentration in the waste starts at about air purity and falls rapidly to the minimum waste purity of about 2 to about 10 vol % oxygen. The equalization falling flow of oxygen gas continues to be removed from the top of adsorber 10 via open valve 42 and supplied to the top of adsorber 12 via open valve 44.

Bed 12: Bed 12 is simultaneously undergoing step 10. As such valve 24 is also open.

Step #6 Co-current void gas recovery with counter current evacuation, supplying void gas to low purity oxygen storage receiver.

This step shows the simultaneous top and bottom evacuation and the recovery of additional void gas.

Bed 10: Waste nitrogen is removed from the bottom of adsorber 10 through open valve 30 to a ROOTS type vacuum pump 36. The pressure falls from a pressure level selected between 7–18 psia, preferably 10–13 psia, most preferably 11.25 psia, to a pressure level selected between 4–12 psia, preferably 6–9 psia, most preferably 7.7 psia. The step is between 1–6 seconds, preferably 3–4 seconds, most preferably 3.5 seconds in duration. The residual pressure and oxygen product at the top of adsorber 10 is withdrawn during this step from the top of the vessel 10 and supplied via open valves 42 and 66 to the low purity low pressure void gas recovery tank 68. This tank 68 is operated in a vacuum to allow for the transfer of the low pressure gas. This step allows for the additional recovery of void gas in the system.

Bed 12: Bed 12 is simultaneously undergoing step 1, as such valves 24 and 56 are also open.

Step #7 Falling pressure evacuation

Bed 10: Waste nitrogen is removed from the bottom of the adsorber 10 through open valve 30 to the ROOTS-type vacuum pump 36. The pressure falls from a pressure level selected between 4–12 psia, preferably 6–9 psia, most preferably 7.7 psia, to a pressure level selected between 2–8 psia, preferably 4–6 psia, most preferably 4.6 psia. The step is between 5–15 seconds, preferably 9–11 seconds, most preferably 9.75 seconds in duration. No flow is removed from the top of adsorber 10.

Bed 12: Bed 12 is simultaneously undergoing step 2, and consequently valve 24 is open.

Step #8 Counter-current purge with low purity void gas and constant pressure evacuation Bed 10: The minimum evacuation pressure has been reached and oxygen purge from the void gas recovery tank 68 is supplied via open valves 66 and 42 to the top of adsorber 10. The pressure remains constant during this step from a pressure level selected between 2–8 psia, preferably 4–6 psia, most preferably 4.6 psia. The step is between 1–6 seconds, preferably 2–4 seconds, most preferably 2.75 seconds in duration. This constant pressure is due to the matching of the purge flow to the evacuation flow via open valve 30. The waste purity (e.g. about 2 to about 10 vol. % oxygen) remains relatively constant during this period.

Bed 12: Bed 12 is simultaneously undergoing step 3. As such, valves 24 and 56 are open.

Step #9 Counter-current purge with void gas from adsorber 12, with raising pressure evacuation Bed 10: The ROOTS-type vacuum pump 36 continues to remove waste gas from the bottom of adsorber 10 via open valve 30, while oxygen equalization is added to the top of adsorber 10 from adsorber 12 via open valves 42 and 44. The pressure in adsorber 10 rises during this step as a result of the oxygen equalization flow from adsorber 12, which is larger than the evacuation flow during this period. The pressure raises during this step from a pressure level selected between 2–8 psia, preferably 4–6 psia, most preferably 4.6 psia, to a pressure level selected between 4–10 psia, preferably 5–8 psia, most preferably 6.6 psia. The step is between 1–5 seconds, preferably 1–3 seconds, most preferably 1.75 seconds in duration. The oxygen concentration of the waste stream 34 begins to elevate slightly, reaching a purity of about 5–15 vol. % oxygen at the end of this step as the oxygen front begins to break through at the bottom of adsorber 10.

Bed 12: Bed 12 is simultaneously undergoing step 4. As indicated above, valve 44 is open.

Step #10 Counter-current repressurization with void gas from adsorber 12 while feeding This step starts the feed air pressurization-adsorption period of adsorber 10.

Bed 10: Air is fed to the bottom of adsorber 10, via open valve 22, from the ROOTS-type compressor 16. The pressure raises rapidly in this step from a pressure level selected between 4–10 psia, preferably 5–8 psia, most preferably 6.6 psia, to a pressure level selected between 7–14 psia, preferably 9–12 psia, most preferably 10.45 psia. The step is between 1–4 seconds, preferably 1–3 seconds, most preferably 2 seconds in duration. Oxygen equalization gas from adsorber 12 is also simultaneously introduced into the top of adsorber 10 during this step via open valves 42 and 44. Adsorber 12 continues to depressurize.

Bed 12: Bed 12 is simultaneously undergoing step 5. As indicated above, valve 44 is open. Valve 32 is also open.

As can be seen from the above description and FIGS. 2–3, the invention employs an additional low purity void gas storage tank (VT). This tank is typically operated in vacuum, and functions to recover and hold void gas of step #6. Some void gas is still removed with co-current pressure transfer steps of gas to the other adsorber as shown in steps #4 and #5.

Through the addition of step #6 additional quantities of gas are recovered during the evacuation into this low purity void tank. The gas stored in this tank is used in step #8 to supply the initial low pressure purge to the vessel.

The purity of the gas stored in the void gas storage tank is lower than the product gas due to the fact that the bulk of this gas is comprised of gas left in the adsorber transfer front, where purity declines rapidly. This gas is best used in the process for the initial reflux introduced as bed purge. The storage of the low purity purge gas in a separate receiver allows for this sequential purging of the vessel with subsequently higher purity gas. This manner of bed refluxing reduces losses associated with mixing of different purity gases.

The invention offers several efficiency improvements over conventional processes. They are as follows:

1) The additional void gas recovered with this process would otherwise have been swept through the adsorber during the evacuation pump down period. This purge gas when swept through the adsorber during pump down acts as an inefficient purge due to the introduction of this gas at the higher evacuation pressures. Because effectiveness of the purge gas is maximized by introducing the gas when the bed is at the lowest adsorption pressure, the overall waste purity when purge is introduced during the pump down would be higher, thus lowering the overall oxygen recovery.

2) Supplying purge gas from a low pressure receiver reduces the throttling inefficiency associated with the purge gas supply. Throttling of gases results in an irreversible energy loss. The storage of purge gas in the lower pressure void tank in accordance with the invention reduces the pressure level at which the purge gas is stored at, hence reducing the lost energy when supplying this gas as purge to the lower pressure adsorber. Conventional systems throttle the purge gas from a supply source at nearly the top adsorption pressure of the system, therefore incurring larger throttling losses.

3) The amount of high purity tank gas needed for the bed reflux is reduced because it is replaced with the recovered (lower purity) top void gas.

4) The storage of the purge gas in the receiver allows for sequential purging of the vessel with subsequently higher purity gas. This manner of bed refluxing reduces product loss associated with mixing of different purity gases.

As indicated above, the additional void gas recovered through the inventive process would otherwise have been relatively inefficiently swept through the adsorber during evacuation pump down (FIG. 1, steps 6 and 7). The gas being swept through the adsorber during pump down would have acted as an inefficient purge due to the introduction of this gas at the higher evacuation pressures. Therefore the overall waste purity would be higher lowering the overall oxygen recovery.

The inventive process is not limited to the process steps recited in Table 1 above. For example, the top evacuation void gas recovery step could be practiced with various cycle combinations. One alternative embodiment uses a continuous feed and vacuum cycle employing similar steps to the cycles described in U.S. Pat. Nos. 5,518,526 and 5,702,504.

This alternative cycle is illustrated in FIG. 4, and differs from the cycle of FIG. 2 in that steps #4 and #9 of the FIG. 2 cycle, wherein the feed blower was unloaded while the falling pressure equalization step was conducted, have been eliminated. This alternative embodiment eliminates these steps and the void gas is recovered during the simultaneous top and bottom evacuation step. This alternative cycle operates both the feed and vacuum pump continuously, reducing the displacement of the feed blower.

In another embodiment, the bed purge with top evacuation void gas can be augmented with an additional purge with product oxygen from tank 50.

Based on the PSA cycle described in FIGS. 2 and 4 above, several modifications can be made to alter one or more of the steps without deviating from the invention. For example, the feed and product pressurization steps can occur simultaneously, rather than sequentially as described above. Also, if the low pressure level in the cycle is less than 1.0 atm, i.e., the PSA cycle utilizes a vacuum pump for evacuation, then the countercurrent depressurization step can be preceded by opening to air until the pressure in the bed drops to 1.0 atm, then evacuation can begin.

The two-bed PSA cycle (i.e., FIGS. 2–4) can also be operated with the use of an equalization tank to allow for greater flexibility in the process. For example, the individual steps in the cycle shown in FIGS. 2 and 4 do not have to occupy fixed periods of time. Thus, physical variables such as pressure and composition can be used to determine the time allocated for each step; thereby, adjusting the process for changes in temperature, pressure and product demand.

Since no bed-bed gas transfer is required, it is possible to run each bed independently, and regard the process as a collection of single bed units. However, for proper sizing and sharing of compressor(s) and vacuum pump(s), some synchronization of the overall cycle of each bed with the cycles of the other beds is necessary.

It should be noted that the inventive cycle is not limited to the illustrated two bed system. Rather, the top evacuation void gas recovery step may be practiced with all single bed and multiple bed cycles to assist in void gas recovery.

Although the invention described here makes use of cylindrical adsorbent beds with shallow dished heads on the top and bottom, and gas flow in the axial direction, other bed configurations may be used. For example, radial beds may be used to achieve a reduction in pressure losses with a concomitant reduction in power consumption. In addition, beds of different adsorbents can be placed in series or in layers within a single bed when two or more $N_2$ or $O_2$ equilibrium selective adsorbents are used in the PSA process. This alternative is illustrated in FIG. 3, where two adsorbents A and B are present in each bed.

In addition, other adsorbents can be packed at various positions in the bed. For example, activated alumina can be placed at the feed end of the bed to remove water and carbon dioxide from the feed stream, then one or more layers of $O_2$ or $N_2$ equilibrium selective adsorbents can be placed on top of the activated alumina to perform the separation of air into a nitrogen enriched product.

Other modifications of the PSA process can be implemented without deviating from the invention. For example, the PSA process of the invention can include the removal of other minor contaminants such as CO, or lighter hydrocarbons, which have a tendency to break through. To prevent the break through of the contaminants, the adsorber bed is modified to include a catalyst, either as a discrete layer or as a component of an adsorbent mixture, which will convert species like CO to $CO_2$, which is subsequently removed. Also, additional layers of adsorbents can be added if necessary to remove the reaction product(s). Another variation is the distribution of the catalyst layer in regions of the bed where the $O_2$ concentration is not yet sufficiently depleted.

The PSA cycle has been described in relation to PSA $O_2$ processes, wherein particular embodiments have been shown, other embodiments are contemplated along with modification of the disclosed features, as being within the scope of the invention. For example, the PSA cycle is not restricted to trans-atmospheric vacuum pressure swing adsorption (VPSA) cycles, and super atmospheric or subatmospheric PSA cycles may also be used. Also, the PSA cycle can be used in other mixture separations, e.g., $N_2/CH_4$ separation from landfill gas, and other gas mixtures, for example, feed containing hydrogen as the nonpreferentially adsorbed product component and various impurities as selectively adsorbable components. These include light hydrocarbons, CO, $CO_2$, $NH_3$, $H_2S$, Ar, and $H_2O$.

Hydrogen-rich feed gas containing at least one of these adsorbable components includes: catalytic reformer off-gas, methanol synthesis loop purge, dissociated ammonia and demethanizer over-head gas, steam-reformed hydrocarbons, ammonia synthesis loop purge gas, electrolytic hydrogen and mercury cell hydrogen. This invention is also useful for separating any or all of the aforementioned adsorbables from gas mixtures in which nitrogen or helium is the primary constituent.

Specific features of the invention are shown in one or more of the drawings for convenience only, as such feature may be combined with other features in accordance with the invention. Alternative embodiments will be recognized by those skilled in the art and are intended to be included within the scope of the claims.

What is claimed is:

1. A pressure swing adsorption (PSA) method for extracting a more preferred gas from a mixture of said more preferred gas and a less preferred gas, said method employing an adsorbent bed within an enclosure which, on an equilibrium basis, exhibits a selective adsorption preference for said less preferred gas, said method comprising the steps of:

a) pressurizing said adsorbent bed to a high pressure with a feed of said mixture to enable said adsorbent bed to adsorb said less preferred gas while simultaneously counter-currently feeding gas obtained from a product tank containing more preferred gas;

b) extracting from said bed at said high bed pressure, a flow of said more preferred gas and storing at least some of said flow of more preferred gas in said product tank;

c) desorbing said less preferred gas from said adsorbent bed by feeding void gas in said enclosure to a void gas storage tank, while simultaneously desorbing said less preferred gas from said adsorbent bed by venting said adsorbent bed to a first low pressure region;

d) terminating feeding of said void gas to said void gas storage tank;

e) further desorbing said less preferred gas from said adsorbent bed by venting said adsorbent bed to a second low pressure region that is lower than said first low pressure region;

f) purging said adsorbent bed by feeding to said adsorbent bed a portion of said void gas from said void gas storage tank while venting said adsorbent bed;

g) pressurizing said adsorbent bed to an intermediate pressure with a flow of equalization gas from a second adsorbent bed; and repeating steps a–g until a requirement for said more preferred gas is satisfied.

2. The PSA method as recited in claim 1, wherein said pressurizing step g) further feeds a portion of said more preferred gas from said product tank to pressurize said adsorbent bed, if said equalization gas is insufficient to cause said adsorbent bed to reach said intermediate pressure.

3. The PSA method as recited in claim 1, wherein said mixture comprises air.

4. The PSA method as recited in claim 3, wherein said more preferred gas is oxygen.

5. The PSA method as recited in claim 4, wherein said oxygen has a purity between about 90 vol. % oxygen to about 95 vol. % oxygen.

6. A pressure swing adsorption (PSA) method for extracting a more preferred gas from a mixture of said more preferred gas and a less preferred gas, said method employing first adsorbent bed and second adsorbent bed, each bed being contained in an enclosure and, on an equilibrium basis, exhibiting a selective adsorption preference for said less preferred gas, said first adsorbent bed sequentially performing steps a, b, c, d, e, f and g while said second adsorbent bed concurrently and sequentially performs steps d, e, f, g, a, b and c, wherein steps a–g comprise:

a) pressurizing one of said first adsorbent bed or said second adsorbent bed to a high pressure with a feed of said mixture to enable said adsorbent bed to adsorb said less preferred gas, while simultaneously counter-currently feeding gas obtained from a product tank containing more preferred gas;

b) extracting from said one of said first adsorbent bed or said second adsorbent bed at bed pressure, a flow of said more preferred gas and storing at least some of said flow of more preferred gas in said product tank;

c) desorbing said less preferred gas from said one of said first adsorbent bed or said second adsorbent bed by feeding void gas in said enclosure to a void gas storage tank, while simultaneously desorbing said less preferred gas from said adsorbent bed by venting said adsorbent bed to a first low pressure region;

d) terminating feeding of said void gas to said void gas storage tank;

e) further desorbing said less preferred gas from said one of said first adsorbent bed or said second adsorbent bed by venting said one of said first adsorbent bed or said second adsorbent bed to a second low pressure region that is lower in pressure than said first low pressure region;

f) purging said adsorbent bed by feeding to said one of said first adsorbent bed or said second adsorbent bed a portion of said void gas from said void gas storage tank while venting said first adsorbent bed or said second adsorbent bed; and g) pressurizing said one of said first adsorbent bed or said second adsorbent bed to an intermediate pressure with a further flow of equalization gas from one of said first adsorbent bed or said second adsorbent; and repeating steps a–g until a requirement for said more preferred gas is satisfied.

7. The PSA method as recited in claim 6, wherein said pressurizing step g) feeds said preferred gas from said product tank to pressurize said one of said first adsorbent bed or said second adsorbent bed, if said void gas is insufficient to cause said one of said first adsorbent bed or said second adsorbent bed to reach said intermediate pressure.

8. The PSA method as recited in claim 6, wherein said mixture comprises air.

9. The PSA method as recited in claim 8, wherein said more preferred gas is oxygen.

10. The PSA method as recited in claim 9, wherein said oxygen has a purity between about 90 vol. % oxygen to about 95 vol. % oxygen.

* * * * *